United States Patent
Perotti et al.

(10) Patent No.: US 6,940,543 B2
(45) Date of Patent: Sep. 6, 2005

(54) WIRELESS TRANSFER OF AT LEAST ONE DIGITAL IMAGE FILE BETWEEN A FIRST DEVICE AND A SECOND DEVICE

(75) Inventors: Jennifer C. Perotti, Pittsford, NY (US); Dana W. Wolcott, Honeoye Falls, NY (US); Steven S. Chapman, Corfu, NY (US); Dan Harel, Rochester, NY (US); Dale F. McIntyre, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 626 days.

(21) Appl. No.: 10/095,377

(22) Filed: Mar. 12, 2002

(65) Prior Publication Data

US 2004/0201687 A1 Oct. 14, 2004

(51) Int. Cl.⁷ .............................................. H04N 5/232
(52) U.S. Cl. ................. 348/211.2; 348/14.02; 348/231.3
(58) Field of Search .......................... 348/207.1, 207.2, 348/14.02, 231.3, 153, 154–159, 10.01, 14; 455/66, 566, 11.1, 41.2, 41.3, 556.1, 577, 248; 709/200, 248; 370/255

(56) References Cited

U.S. PATENT DOCUMENTS

| | | | |
|---|---|---|---|
| 5,634,144 A | 5/1997 | Mauro et al. | |
| 5,666,159 A | 9/1997 | Parulski et al. | |
| 5,893,037 A | 4/1999 | Reele et al. | |
| 6,167,469 A | 12/2000 | Safai et al. | |
| 6,704,293 B1 * | 3/2004 | Larsson et al. | 370/255 |
| 6,751,200 B1 * | 6/2004 | Larsson et al. | 370/255 |
| 6,757,518 B2 * | 6/2004 | Spratt et al. | 455/11.1 |
| 2001/0005368 A1 * | 6/2001 | Rune | 370/390 |
| 2002/0122410 A1 * | 9/2002 | Kulikov et al. | 370/349 |
| 2003/0030731 A1 * | 2/2003 | Colby | 348/231.3 |
| 2003/0103144 A1 * | 6/2003 | Sesek et al. | 348/207.1 |
| 2004/0218902 A1 * | 11/2004 | Yanagita | 386/52 |

* cited by examiner

Primary Examiner—Ngoc-Yen Vu
Assistant Examiner—Hung Lam
(74) Attorney, Agent, or Firm—Raymond L. Owens

(57) ABSTRACT

A method for transmitting at least one digital image file between first and second devices, the first and second devices having limited range wireless transceivers; a user operating the first device selecting at least one electronic address designating said at least one second device; and said first device broadcasting at least one digital image file and the at least one selected electronic address until received and stored by one or more third non-designated devices. The method compares the received at least one selected electronic address to a stored electronic address belonging to said third non-designated device and automatically re-broadcasting the at least one digital image file if the received at least one selected electronic address does not match the stored electronic address of said at least one third non-designated device; and said at least one second device receiving and storing said at least one digital image file.

11 Claims, 7 Drawing Sheets

WIRELESS TRANSFER OF AT LEAST ONE DIGITAL IMAGE FILE BETWEEN A FIRST DEVICE AND A SECOND DEVICE

FIELD OF THE INVENTION

The invention relates to the wireless transfer of digital image files from one device to a second device wherein the devices can be electronic cameras.

BACKGROUND OF THE INVENTION

Transmitting digital image files between two devices is well known in the art. For example, in U.S. Pat. No. 5,634,144 to Mauro et al., an electronic camera communicates directly with a computer through the use of infrared light beams. Similarly, in U.S. Pat. No. 5,666,159 to Parulski et al. and U.S. Pat. No. 5,893,037 to Reele et al., an Rf communication link is disclosed for transferring digital image files between two devices. However, these devices transmit their data with a determinate path and in real time. For example, they either communicate directly with a second designated device or indirectly via a fixed position repeater or base station. The infrastructure associated with these fixed position repeaters is expensive and repeater stations are designed to have a determinate path to another repeater, if necessary, before reaching a second designated device. Furthermore, repeating stations have no need to queue data transmissions.

SUMMARY OF THE INVENTION

It is an object of the present invention to facilitate the wireless transmission of digital image files between devices such as electronic cameras.

This object is achieved by a method for transmitting at least one digital image file between a first device and at least one second device, comprising the steps of:

a) providing the first and second devices with limited range wireless transceivers;

b) a user operating the first device selecting at least one electronic address designating said at least one second device;

c) said first device broadcasting at least one digital image file and the at least one selected electronic address until received and stored by one or more third non-designated devices having limited range wireless transceivers;

d) said one or more third non-designated devices comparing the received at least one selected electronic address to a stored electronic address belonging to said third non-designated device and automatically re-broadcasting the at least one digital image file if the received at least one selected electronic address does not match the stored electronic address of said at least one third non-designated device; and e) said at least one second device receiving and storing said at least one digital image file from the third non-designated devices.

ADVANTAGES

The present invention makes use of the wireless transfer of digital image files between two wireless electronic camera users following an indeterminate path using a plurality of wireless intermediate users until reception by the designated second user is achieved.

An advantage of the present invention is that it does not require the use of designated channels and further that intermediate devices can be portable and operate effectively provided they are within the range of a broadcasted signal.

A further advantage of the present invention is it eliminates the need for incurring expenses typically associated with the services of intermediate carriers.

A still further advantage of the present invention is that a user can transfer those digital image files to electronic cameras which are to be capable of operating within a designated area and eliminate access to the broadcasting information by use of a selected electronic address.

A still further advantage of the present invention is that the transfer path between two electronic camera users does not have to be pre-determined at the time when a digital image file is sent.

DETAILED DESCRIPTION OF THE INVENTION

Figure 1:
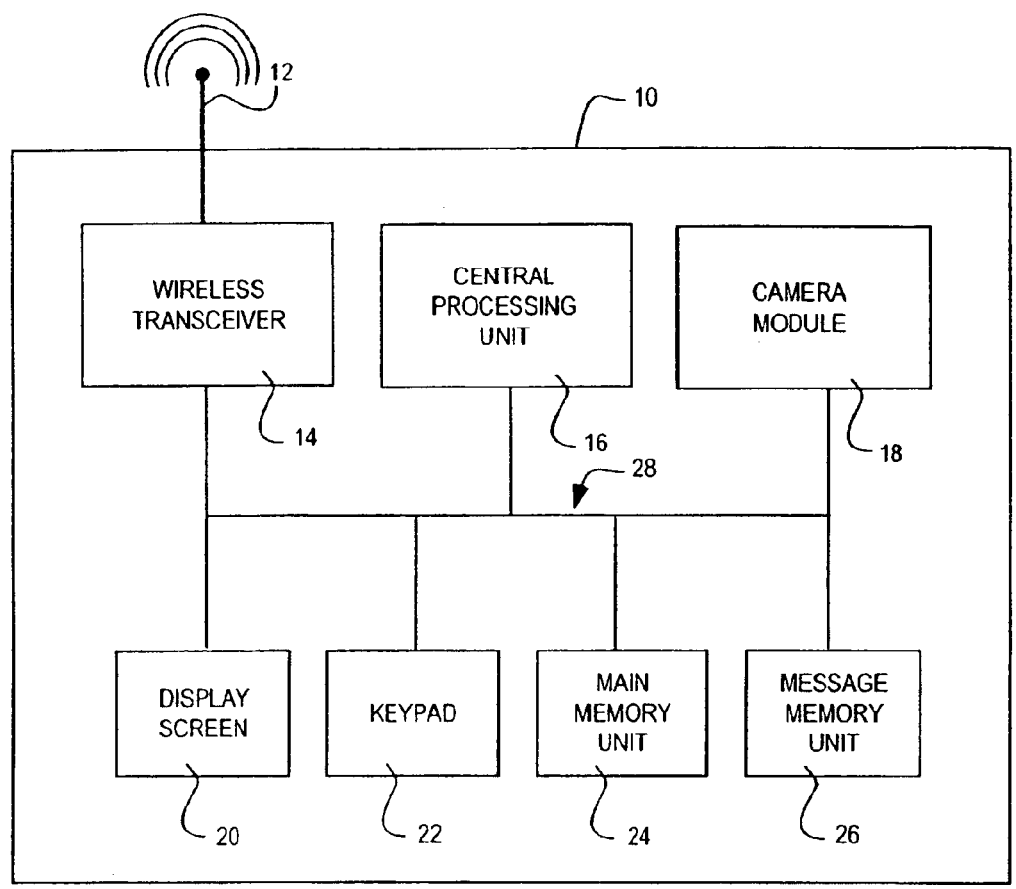
FIG. 1 is a system block diagram showing an electronic camera with a transceiver that can be use in accordance with the present invention.

In FIG. 1, a system block diagram is shown depicting the necessary blocks of a portable electronic camera 10 with a limited transmission range wireless transceiver for transferring digital image files between wireless devices. It will be understood that the method of transferring digital image files, in accordance with the invention, can be practiced by other portable electronic devices such as laptop computers, personal digital assistants or any other device possessing a compatible interface. These other devices can obtain digital image files for transferring from many different sources that are well known in the art.

Electronic camera 10 includes a camera module 18 for capturing a digital image of a scene. Typically, this includes a lens, an image sensor, electronic processing circuitry and other elements that are commonly known in the art and are omitted here for the sake of clarity. The camera module 18 is under the control of a central processing unit 16 which also controls other functional blocks including a limited range wireless transceiver 14, a display screen 20, a keypad 22, a main memory unit 24 and a message memory unit 26. Control bus 28 connects the various functional blocks with central processing unit 16 for the purpose of communicating the various control signals. It will be understood that camera module 18 is not limited to capturing still images, but can also capture video images (with sound) and therefore digital image files will be understood to include both digital still images and digital motion images further including sound.

Display screen 20 can be, for example but not by way of limitation, a Liquid Crystal Display (LCD) type color display screen. Display screen 20 is used for displaying digital image files captured by the camera module 18 or reviewing digital image files stored in the main memory unit 24. Digital image files stored in the main memory unit 24 are retrieved for display under the control of the central processing unit 16 which interprets a user's interaction with keypad 22 for causing a particular digital image file to be selected for display as is commonly known in the art. In addition to storing captured digital image files from the camera module 18, main memory unit 24 can store electronic addresses of various users including the electronic address associated with electronic camera 10. Keypad 22 is also used to select a second designated device to receive a digital image file from the electronic addresses stored within main memory unit 24. Furthermore, keypad 22 can be used to select electronic addresses that the user does not wish to receive digital image files from. Main memory unit 24 can also store various types of information about the user of the electronic camera 10.

Message memory unit 26 is shown as a separate block for the sake of clarity. It will be understood however, that message memory unit 26 can be a partition of the main memory unit 24 or a physically separate unit as shown in FIG. 1. Message memory unit 26 is under the control of the central processing unit 16 and stores digital image files that are received by wireless transceiver 14 via antenna 12. Digital image files stored therein can be displayed only if the electronic address of electronic camera 10 corresponds to the electronic address of the designated second device designated by the user sending the digital image file. The digital image file being transferred includes a file header further including the electronic address of the transmitting first device and the designated second device. Central processing unit 16 compares the electronic address of the second designated device with the stored electronic address of electronic camera 10 to determine whether electronic camera 10 is the designated second device. The process of designating the second device will be discussed further with respect to FIG. 3. If the stored electronic address of electronic camera 10 does not match the electronic address of the designated second device retrieved from the file header of the digital image file being transferred, then central processing unit 16 causes the digital image file to be rebroadcast via wireless transceiver 14 and antenna 12 to another third undesignated electronic camera (see FIG. 2). In this manner, a digital image file propagates via an indeterminate path from the first device to the designated second device via at least one third non-designated device. This process will be discussed in detail with respect to FIGS. 2 and 4.

The electronic camera 10 captures digital images of a scene and can transmit the corresponding digital image files via wireless transceiver 14 using an antenna 12 to a variety of electronic devices with compatible receivers and antennae. Wireless transceiver 14 can use various radio frequency (Rf) wireless communication protocols, such as Bluetooth and Wireless LAN. It will be appreciated that transceivers such as Bluetooth transceivers have a limited transmission range and that an intended designated second device must be within this transmission range to receive a digital image file. In an alternate embodiment, wireless transceiver 14 can be an infrared transceiver that doesn't require the use of antenna 12.

Figure 2:
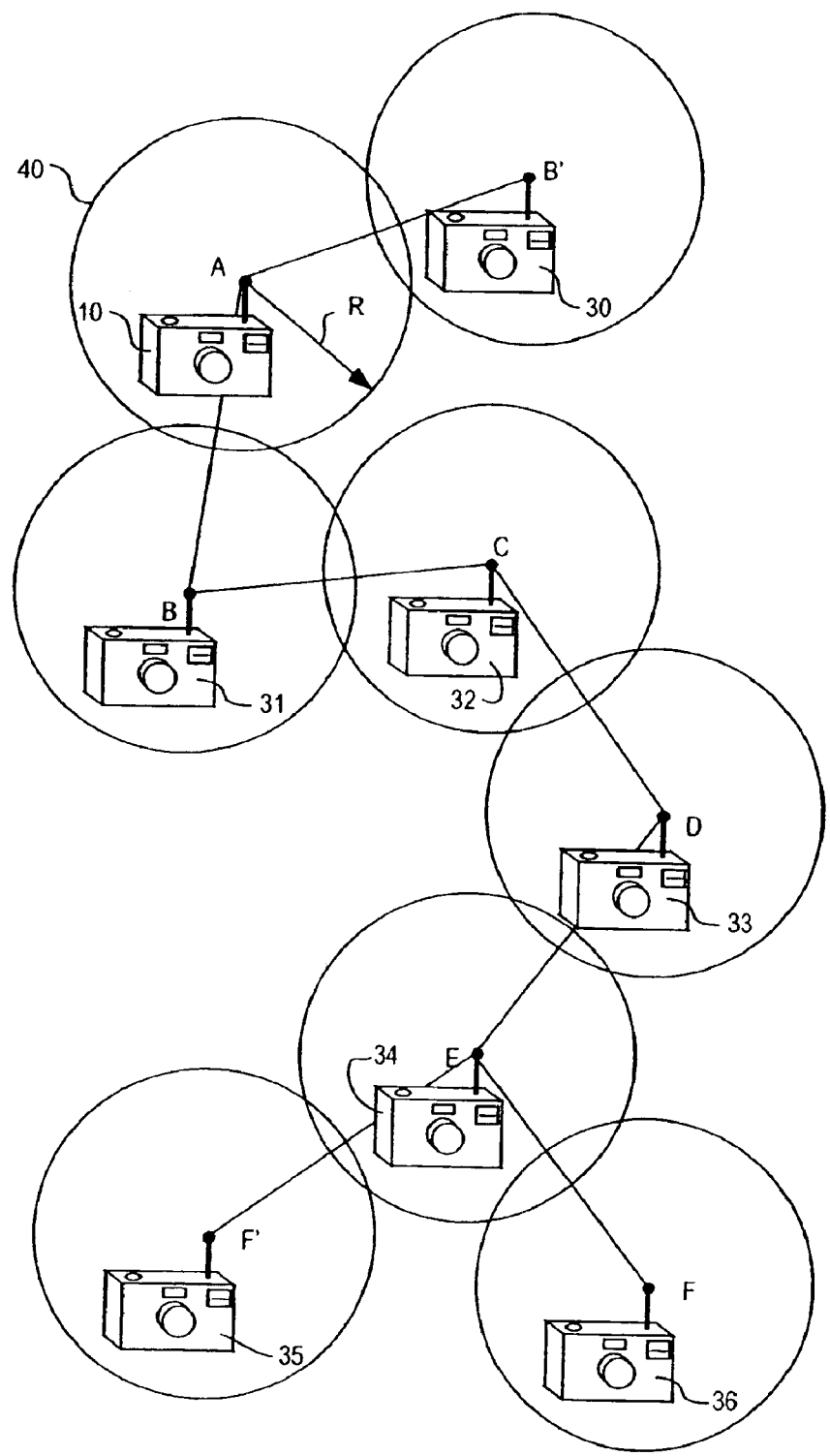
FIG. 2 is a flowpath showing how a second selected electronic camera receives a digital image file by way of a number of third non-designated electronic cameras and wherein the flowpath varies depending upon the location of the electronic cameras.

Turning now to FIG. 2, a plurality of electronic cameras 10, 30, 31, 32, 33, 34, 35, and 36 are shown in a transmission arrangement in accordance with the present invention. Electronic camera 10 is positioned at point A and has a digital image file to transfer to the electronic camera 36 located at point F. Circle 40 is the effective communication area of electronic camera 10 and is defined by the broadcast radius R. For the sake of clarity, electronic cameras 30, 31, 32, 33, 34, 35, and 36 have equivalent broadcast radii R, but the invention is not so limited. Any electronic cameras 30, 31, 32, 33, 34, 35, and 36 located within the effective communication area 40 of electronic camera 10 can receive the digital image file that has been selected to transfer.

Initiating the transfer of the digital image file to electronic camera 36, wireless transceiver 14 of electronic camera 10 under the control of the central processing unit 16 causes the digital image file to be broadcast via antenna 12 into the effective communication area 40. The digital image file is received by electronic camera 30 located at point B', and by electronic camera 31 located at point B since their respective communication areas 40 overlap with communication area 40 of the transmitting electronic camera 10. Electronic cameras 30, 31 store the transmitted digital image file in their respective message memory units 26. It will be understood that the successful transmission between two devices includes an acknowledgement by the receiving device to confirm receipt as is typical in transmissions standards such as Bluetooth. Since the electronic addresses of electronic cameras 30 and 31 do not match the electronic address of the designated second device which in the example is electronic camera 36, the digital image file is not permitted to be displayed on either electronic camera 30 or electronic camera 31. The digital image file is then automatically re-broadcast from the antennae 12 of electronic camera 30 and electronic camera 31 into their effective communication areas respectively.

The digital image file re-broadcast from electronic camera 30 is not received by another electronic camera because there are no electronic cameras within its effective communication area 40 that haven't already received the digital image file. Electronic camera 10 is within the communication area 40, but does not accept the digital image file for rebroadcast immediately to prevent an endless communication loop from two nearby electronic cameras. This will be discussed in further detail with respect to FIG. 6. The digital image file re-broadcast from electronic camera 31 is received by electronic camera 32 at point C and after determining that electronic camera 32 is not the designated second device, the digital image file is re-broadcast again. In a similar manner, the digital image file wanders through an indeterminate path between electronic cameras 31, 32, 33, 34, and 35 that act as message re-broadcasters and to the eventual designated second device, electronic camera 36. When the digital image file reaches electronic camera 36, the digital image file is displayed on display screen 20 of electronic camera 36, and electronic camera 36 broadcasts a confirmation message that the designated second device has received the digital image file. The confirmation message follows a similar non-determinate transmission path to the first device, in this case, electronic camera 10.

It should be noted that the path denoted by points A, B, C, D, E, and F can take any non-determinate shape depending on the physical movement of the users of electronic cameras 10, 30, 31, 32, 33, 34, 35, and 36. The sequential points A, B, C, D, E, and F of FIG. 2 are defined by the position of the antennae 12 of the various electronic cameras at any point in time and are not defined fixed positions as in typical telecommunication networks. For example, if electronic camera 32 moves point C into the effective communication area 40 of electronic camera 34, then there is no need for electronic camera 33 in the network. Furthermore, the path may not be completed immediately as overlapping effective communication areas 40 may not form a viable network until users carrying the electronic cameras move into appropriate positions. It should also be noted that an individual user can remove power from his/her electronic camera. In the preferred embodiment, this action erases the message memory unit 26 enabling it to receive another digital image file for re-broadcast. It should be obvious that depending on the amount of memory available in message memory unit 26 and the size of the digital image file to transfer, multiple files can be carried and rebroadcast by an individual electronic camera. Furthermore, the user can, for example but not by way of limitation, select a predetermined criterion such as the total number of re-broadcast attempts, the elapsed time for re-broadcast attempts, or the frequency of re-broadcast attempts of a digital image file in its message memory unit 26. Such predetermined criteria are stored in the main memory unit 24 under the control of the central processing unit 16. If a confirmation message is not returned to the first device, which in this example is electronic camera 10, within a certain period of elapsed time, the user of electronic camera 10 can choose to send the same digital image file to the same designated second device.

Figure 3:
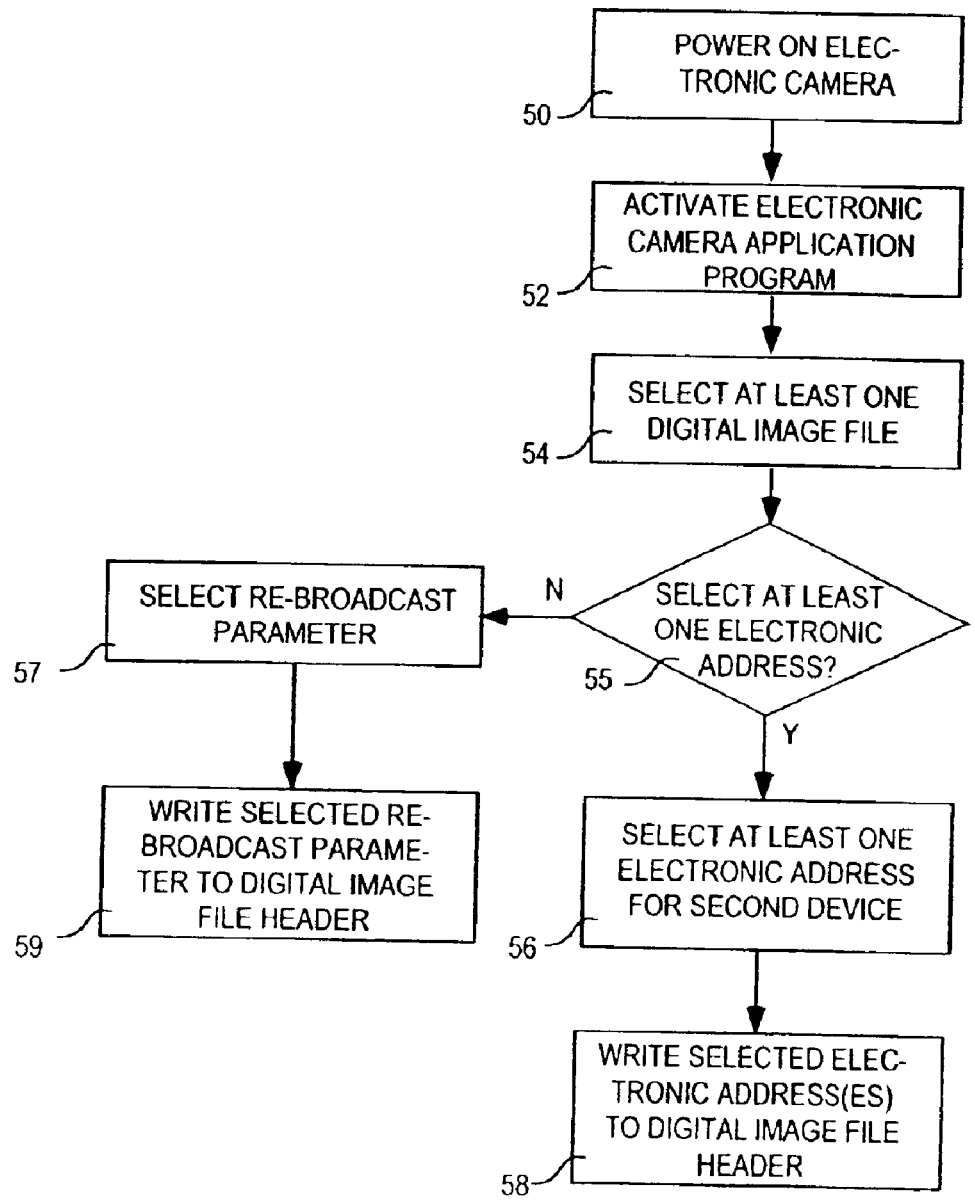
FIG. 3 is a simplified flowchart depicting the process of operating electronic cameras in accordance with the present invention.

The operation of electronic camera 10 is illustrated in greater detail in the simplified flowchart illustrated in FIG. 3. The user turns on electronic camera 10 (step 50) using a power switch (not shown) to activate (step 52) a camera application program stored in main memory unit 24. The camera application program permits the user to select at least one digital image file (step 54) stored in main memory unit 24. The user can choose to select (step 55) at least one electronic address of a second designated device(s) for receiving the digital image file. If no electronic address is selected, the user is intending to broadcast the digital image file to any device within range and can further select the number of times the digital image file is re-broadcast by selecting (step 57) a re-broadcast parameter that is greater than zero which is written (step 59) to the digital image file header. If a user chooses to select at least one electronic address in step 55, the electronic address(es) is(are) selected with keypad 22 in step 56. Central processing unit 16 writes (step 58) the selected electronic address(es) to the digital image file header preparing the selected digital image file for transmission. In this manner, the user of camera 10 can designate a plurality of second devices to receive a particular digital image file and that the file header associated with the transmitted digital image file contains a plurality of electronic addresses that can successfully receive the digital image file.

Figure 4:
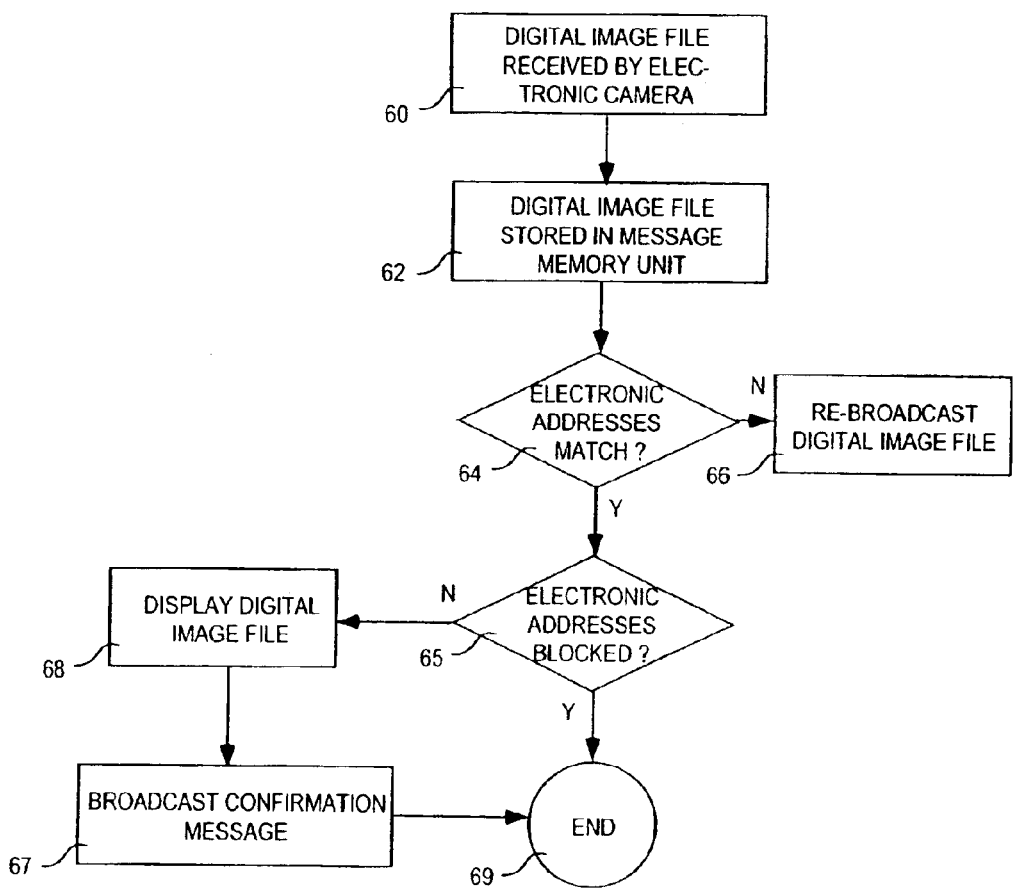
FIG. 4 is a flow diagram depicting the operation of an electronic camera under the control of a Central Processing Unit when the electronic camera receives a digital image file.

Turning now to FIG. 4, electronic camera 10 receives (step 60) a digital image file via transceiver 14 and antenna 12. The central processing unit 16 then causes the received digital image file to be stored (step 62) in message memory unit 26. Central processing unit 16 compares (step 64) the electronic address of the designated second device in the header of the stored digital image file with the electronic address of electronic camera 10. If the electronic address of designated second device matches the electronic address for electronic camera 10, central processing unit 16 checks (step 65) to see if reception from receiving digital image files from the first device is blocked. If reception is not blocked, the digital image file is displayed (step 67), and the digital image file is not re-broadcast. A confirmation message is broadcast (step 68) from the designated second device back to the first sending device. If the designated electronic address does not match the electronic address for electronic camera 10, the digital image file is re-broadcast (step 66) through transceiver 14 and antenna 12.

Figure 5:
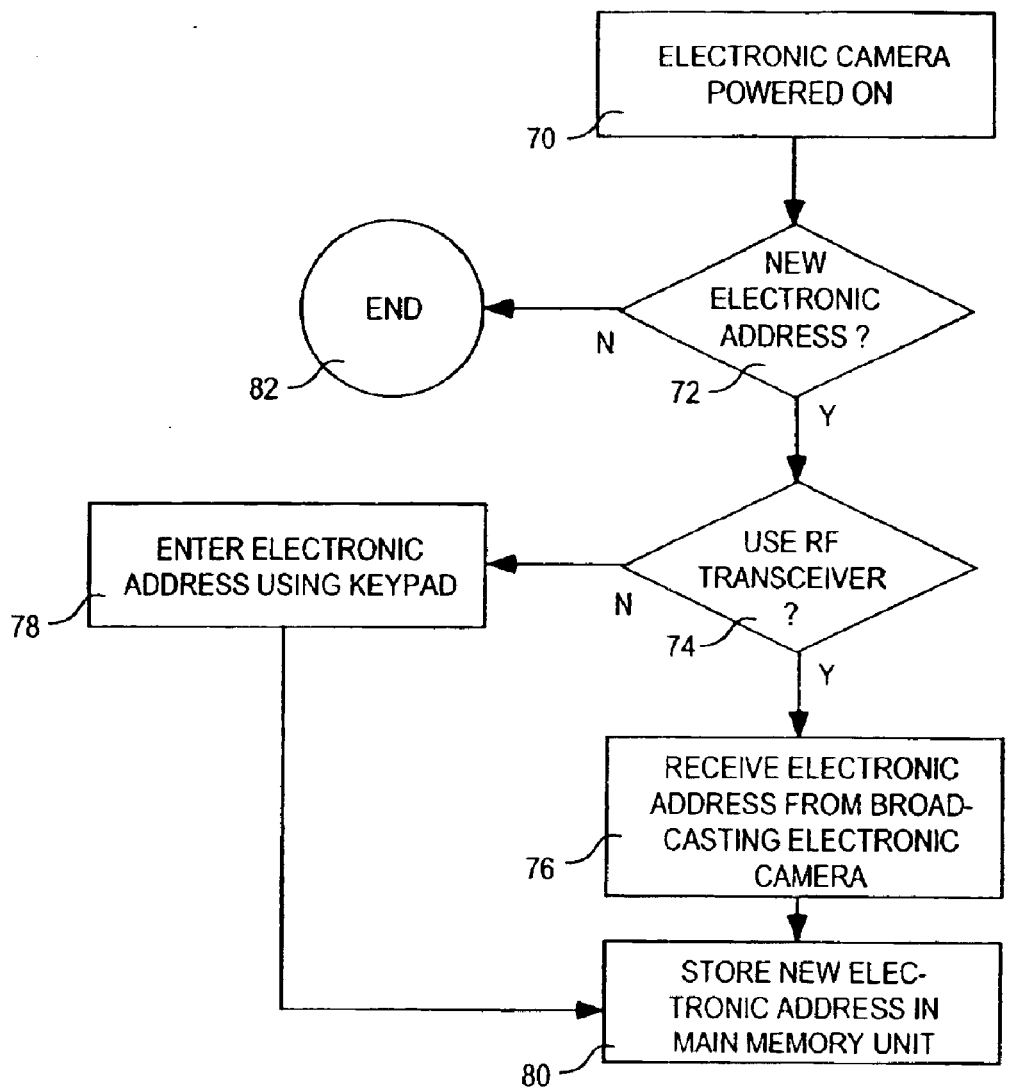
FIG. 5 is a flow diagram depicting how the electronic address of a new second designated device is entered into the electronic camera in FIG. 1.

The operation of the electronic camera 10 is illustrated in greater detail in the flow diagram depicted in FIG. 5. Powering on (step 70) the electronic camera 10, a user using the keypad 22 chooses to enter a new electronic address (step 72) and further keystrokes permit the user to choose (step 74) to enter the new electronic address via the transceiver 14. In this mode, the user of electronic camera 10 permits a second user to bring a second device, such as electronic camera 30, into the effective communication area 40 of electronic camera 10 to receive (step 76) an electronic address from electronic camera 30. The central processing unit 16 causes a list of electronic addresses stored in main memory unit 24 to be updated with the newly received electronic address (step 80). If the user of electronic camera 10 so desires, he/she can enter a new electronic address using keypad 22 (step 78) in a conventional manner. The keypad-entered electronic address is stored in main memory unit 24.

Figure 6:
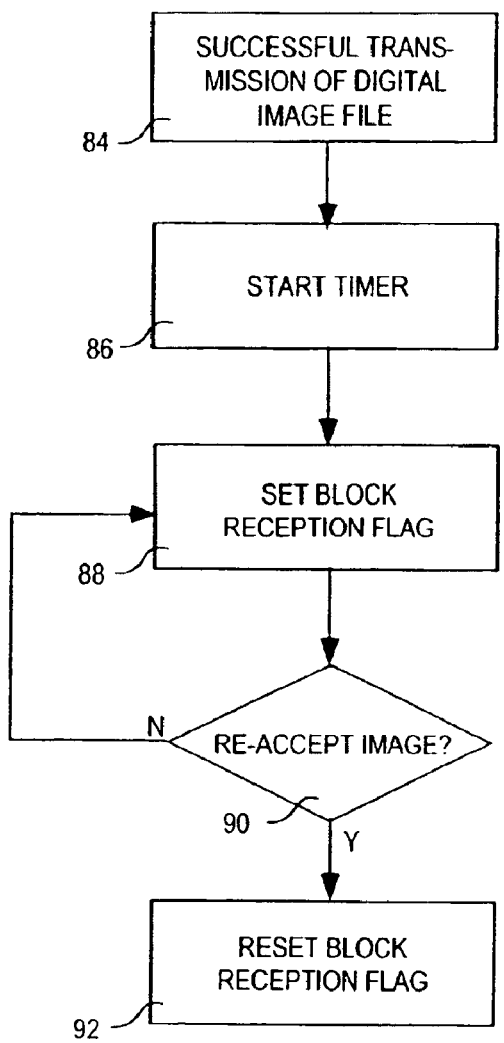
FIG. 6 is a flow diagram depicting how a broadcasting electronic camera blocks reception of a file that it recently broadcast.

FIG. 6 is a flow diagram depicting the operation of electronic camera 10 under the control of the central processing unit 16 which prevents the reception of a digital image file that electronic camera 10 has recently transmitted. Beginning with the successful transmission (step 84) of a digital image file, electronic camera 10 starts an internal timer, not shown, (step 86) and sets a block reception flag (step 88) corresponding to the last digital image file transmitted. Electronic camera 10 monitors the status of the timer, which determines when to re-accept (step 90) the digital image file that was the last digital image file transmitted. At the expiration of the timer, central processing unit 16 resets the block reception flag (step 92) thus enabling reception. This process is necessary to prevent, for example, electronic camera 10 from transmitting a digital image file to electronic camera 30 which rebroadcasts the digital image file back to electronic camera 10 forming an endless loop because the two electronic cameras remain in proximity of each other. The user of electronic camera 10 can alternatively choose to block reception of any digital image file for a period of time governed by the timer.

Figure 7:
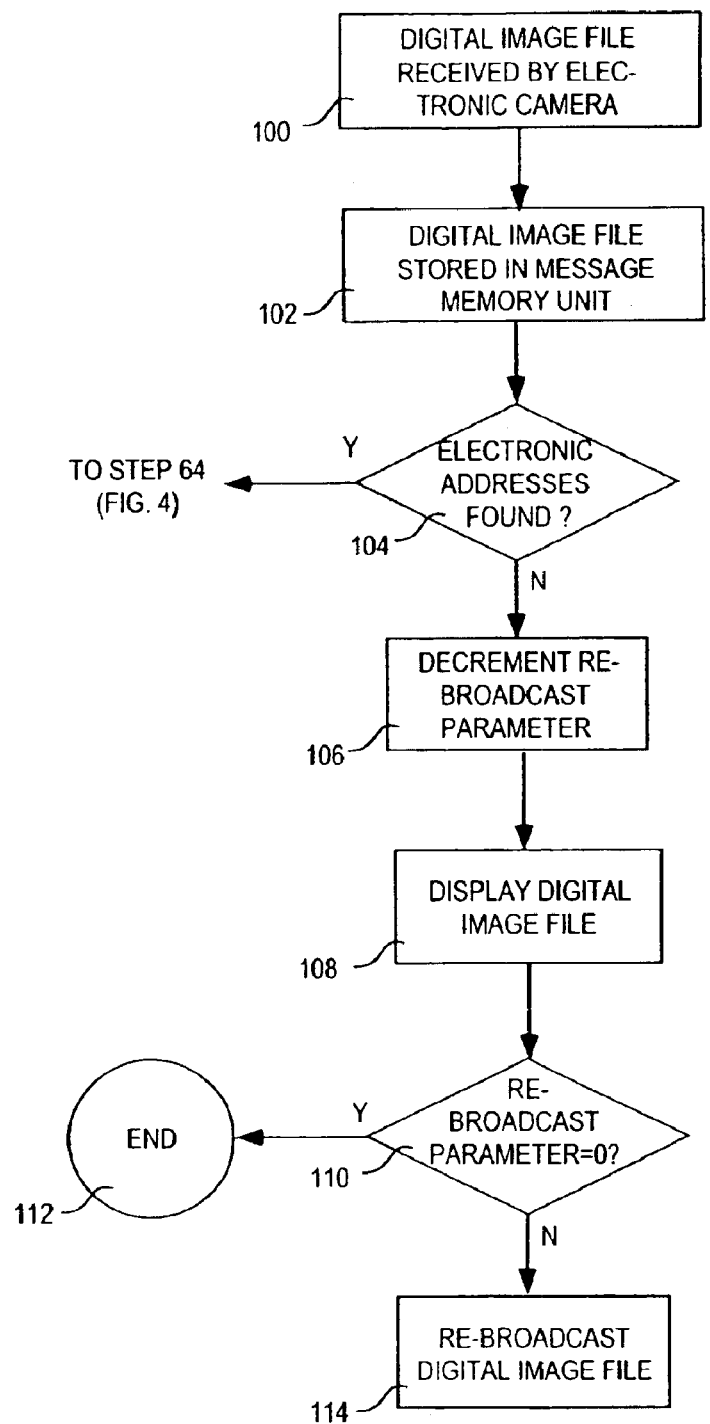
FIG. 7 is a flow diagram depicting a technique for broadcasting a digital image file.

In an alternate embodiment shown in FIG. 7, the user of electronic camera 10 does not designate an electronic address of a second device (step 56, FIG. 3). In this mode, any non-designated device can receive and display the broadcast digital image file. Beginning in step 100, electronic camera 10 receives a digital image file via transceiver 14 and antenna 12. The central processing unit 16 then causes the received digital image file to be stored (step 102) in message memory unit 26. Central processing unit 16 checks to see if an electronic address is found (step 104) in the digital image file header. If an electronic address is found, the process shifts to step 64 of FIG. 4. If no electronic address is found, central processing unit 16 retrieves and decrements a re-broadcast parameter (step 106) from the digital image file header and the digital image file is displayed (step 108). If the decremented re-broadcast parameter is not zero (step 110), the digital image file is rebroadcast (step 114). Otherwise, when the re-broadcast parameter is zero, the repeating broadcast process ends in step 112. In this manner, users of devices such as described can broadcast a digital image file along with a re-broadcast parameter that permits each receiving device to display the digital image file and causes the digital file to be re-broadcast to other receiving devices.

The invention has been described in detail with particular reference to certain preferred embodiments thereof, but it will be understood that variations and modifications can be effected within the spirit and scope of the invention.

PARTS LIST 10 electronic camera
12 antenna
14 wireless transceiver
16 central processing unit
18 camera module
20 display screen
22 keypad
24 main memory unit
26 message memory unit
28 control bus
30 electronic camera
31 electronic camera
32 electronic camera
33 electronic camera
34 electronic camera
35 electronic camera
36 electronic camera
50 step
52 step
54 step
55 step
56 step
57 step
58 step
59 step
60 step
62 step
64 step
65 step
66 step
67 step
68 step
69 step
70 step
72 step
74 step
76 step
78 step
80 step
82 step
84 step
86 step
88 step
90 step
92 step
100 step
102 step
104 step
106 step
108 step
110 step
112 step
114 step

What is claimed is:

1. A method for transmitting at least one digital image file between a first device and at least one second device, comprising the steps of:
   a) providing the first and second devices with limited range wireless transceivers;
   b) a user operating the first device selecting at least one electronic address designating said at least one second device;
   c) said first device broadcasting at least one digital image file and the at least one selected electronic address until received and stored by one or more third non-designated devices having limited range wireless transceivers;
   d) said one or more third non-designated devices comparing the received at least one selected electronic address to a stored electronic address belonging to said third non-designated device and automatically re-broadcasting the at least one digital image file if the received at least one selected electronic address does not match the stored electronic address of said at least one third non-designated device; and
   e) said at least one second device receiving and storing said at least one digital image file from the third non-designated devices.

2. The method of claim 1 further including the step of broadcasting a confirmation message by the at least one second device acknowledging receipt of the digital image file to the first device.

3. The method of claim 1 wherein the first, second, and third devices are electronic cameras.

4. The method of claim 1 wherein broadcasting is in the RF microwave or infrared portion of the spectrum.

5. The method of claim 3 wherein broadcasting by one of the electronic cameras continues until it is determined that the digital image file has been received by another device or presumed to be received by another device according to at least one predetermined criterion.

6. The method of claim 3 wherein each electronic camera includes a display but can only access for display the received digital image file if it includes the at least one selected electronic address.

7. The method of claim 3 wherein the electronic cameras are portable.

8. The method of claim 1 further including the step of broadcasting an electronic address which is effective after receipt as the electronic address for a second designated device.

9. The method of claim 1 further including the step of permitting any one of the devices to erase the stored digital image file.

10. A method for transmitting at least one digital image file between a first device and at least one second device, comprising the steps of:
    a) providing the first and second devices with limited range wireless transceivers;
    b) a user operating the first device having an electronic address and selecting at least one electronic address designating said at least one second device;
    c) said first device broadcasting at least one digital image file, the electronic address of said first device, and the at least one selected electronic address until received and stored by one or more third non-designated devices having limited range wireless transceivers;
    d) said one or more third non-designated devices comparing the received at least one selected electronic address to a stored electronic address belonging to said third non-designated device and automatically re-broadcasting the at least one digital image file if the received at least one selected electronic address does not match the stored electronic address of said at least one third non-designated device; and
    e) said at least one second device selectively receiving and storing said at least one digital image file from the third non-designated devices.

11. The method of claim 10 wherein selectively receiving at least one digital image file is based on the electronic address of the first device.

* * * * *